Feb. 21, 1967   R. H. DE WITT   3,304,811
HAND SAW GRINDER

Filed Sept. 24, 1964   3 Sheets-Sheet 1

INVENTOR
RAYMOND H. DEWITT

BY
Oberlin, Maky & Donnelly
ATTORNEYS

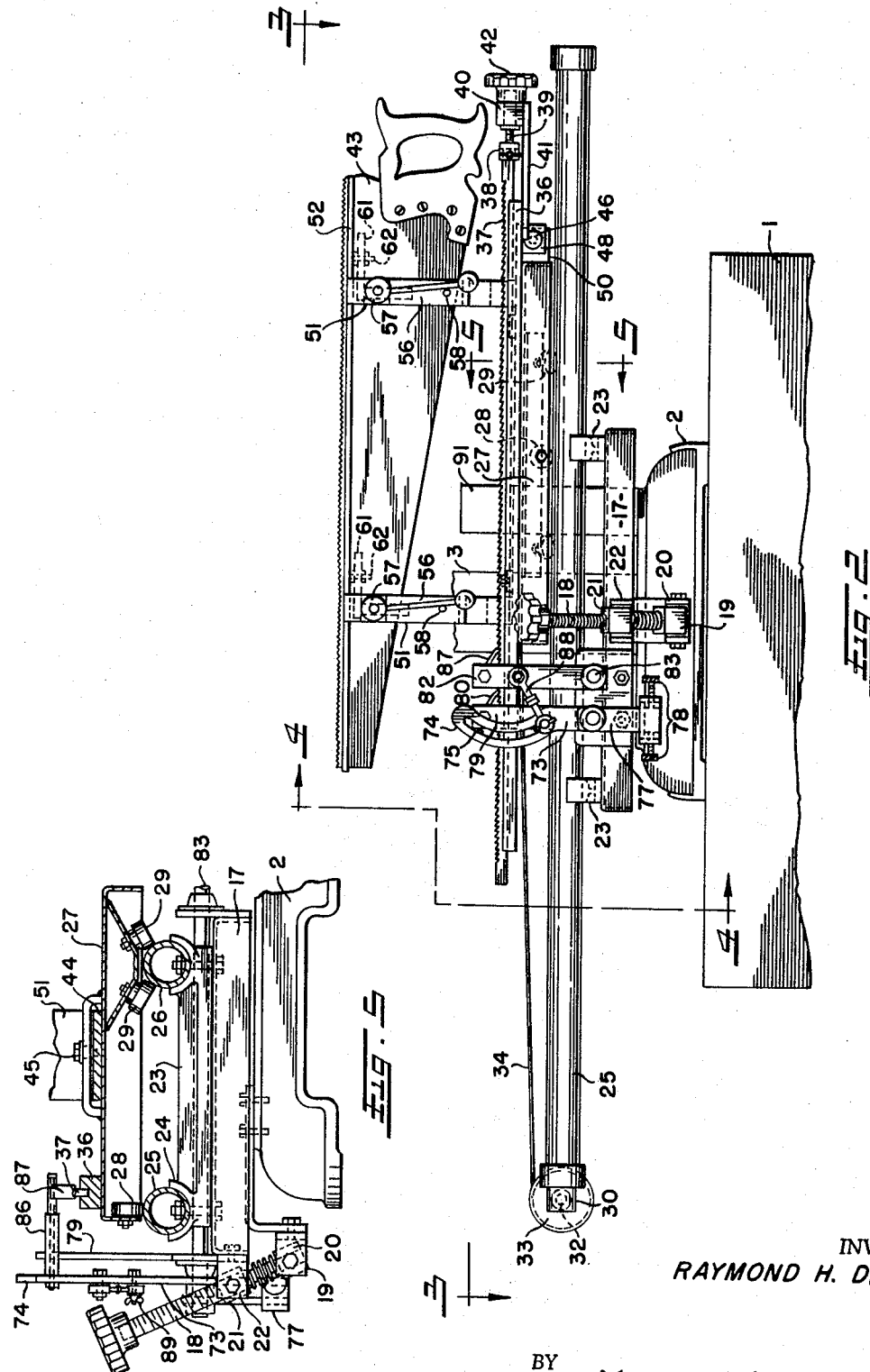

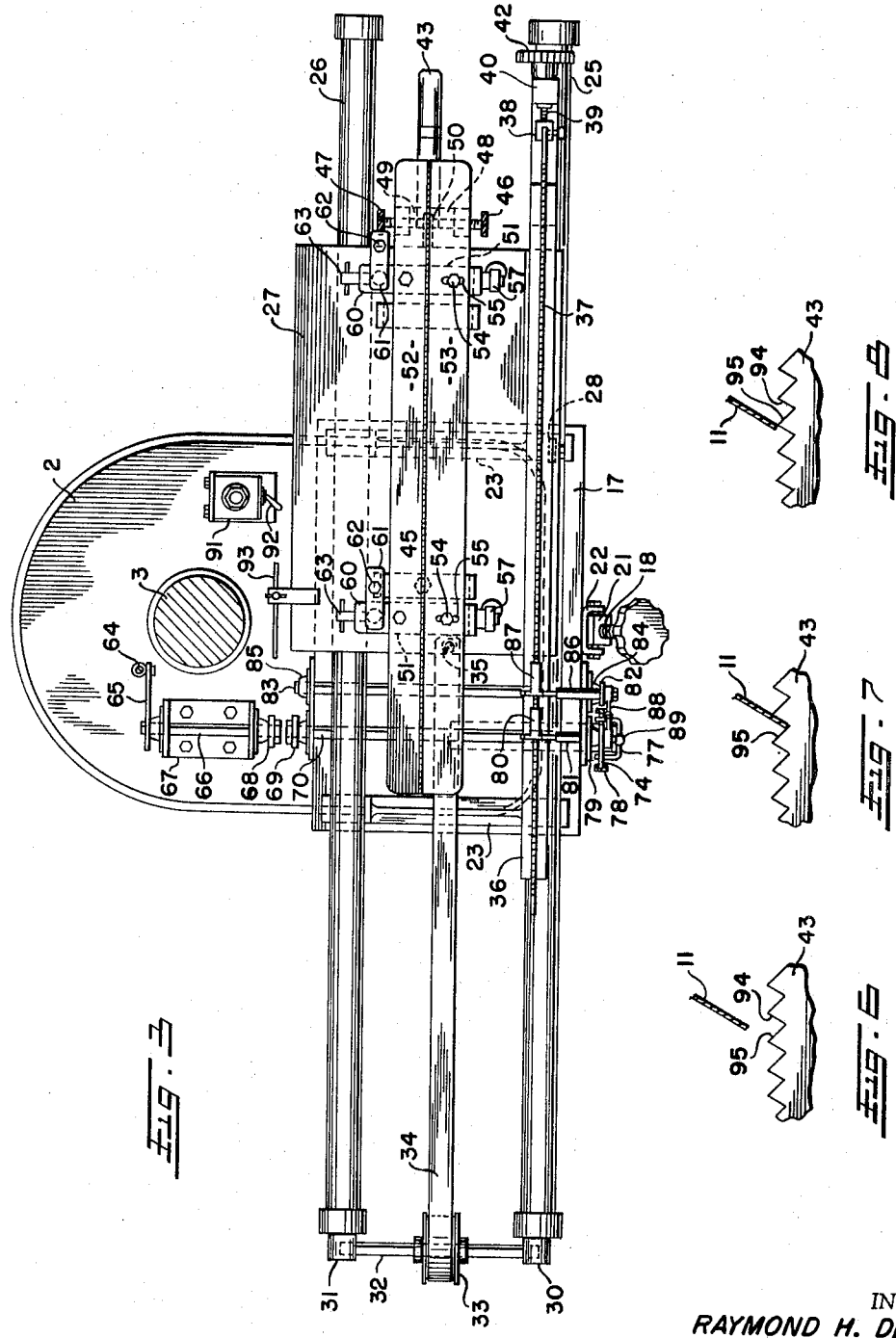

United States Patent Office 3,304,811
Patented Feb. 21, 1967

3,304,811
HAND SAW GRINDER
Raymond H. De Witt, Plymouth, Ohio, assignor to The Fate-Root-Heath Company, Plymouth, Ohio, a corporation of Delaware
Filed Sept. 24, 1964, Ser. No. 398,935
14 Claims. (Cl. 76—43)

The present improvements relate to apparatus for grinding the teeth of hand saws and to the manner in which such grinding operation is performed.

More particularly, the apparatus involved is of the automatic type comprising, as basic assemblies, a motor driven grinding wheel, head structure for mounting the grinding wheel and including power means for causing the wheel cyclically to execute a pre-determined compound movement, saw carriage means for locating and supporting the saw in position for engagement of the wheel with the teeth of the saw during a portion of the compound movement of the former, and feed mechanism for advancing the hand saw relative to the head structure in such timed relation as successively to present the saw teeth to the wheel in the condition for grinding. In a conventional grinder of this class, the grinding wheel will usually be found moved both vertically to reciprocate the wheel and angularly to provide engagement with the edges of the teeth for sharpening of the same at alternate angles relative to the body of the saw. It is of course also conventional to provide such adjustments of the head movement as to determine the stroke of the wheel and its angular dispositions in order to accommodate the particular type and formation of hand saw to be ground, with these adjustments being made in the initial setting up of the machine to grind a given saw either for forming the cutting edges of the teeth or to restore the same by sharpening.

Since the grinder, after the initial setting of the appropriate degrees of the movement of the grinder wheel, will automatically proceed to work the entire series of teeth, it is necessary that the indexing of the saw which brings the teeth successively to the grinding position be in exact synchronism with the movement of the wheel produced by the head structure. This indexing must, of course, also include for practical purposes an adjustment in the increments of advance to accommodate the handling of saws with teeth of varying pitch. It will be appreciated by those skilled in the art that an almost negligible initial error in the feed will be cumulative as the operation proceeds, so that accurate indexing is essential to proper automatic operation as intended for this class of machine.

It is a primary object of the present invention to provide an improved assembly for the mounting and indexing of a hand saw in such a grinding machine, particularly with respect to satisfying the noted need for accuracy and reliability.

Another object is to provide such an assembly in which the saw can be centered very exactly with respect to the grinding wheel, since this consideration is also extremely important to the performance of the machine and the results obtained.

It is also an object of the invention to provide an interrelation of the movement of the grinding wheel and the feed of the saw which improves the efficiency of the grinding in respect of both accurate result and speed of the operation.

It is still a further object of the present improvements to provide a saw feeding device utilizing a separate precisely machined gauge or index bar to direct the incremental advances of the means in which the saw is positioned and supported. Another object is to provide a feed mechanism in which such a separate index bar is used in cooperation with a multiple pawl assembly, the operation of which entails distinct and complemental advance and indexing functions.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 2 is a front elevation of the saw supporting and feeding mechanism of this grinder;

FIG. 3 is a top plan view of the assembly as shown in FIG. 2, as indicated by the line 3—3 in the latter;

FIG. 5 is a further transverse sectional view, the plane of which is indicated by the line 5—5 in FIG. 2; and FIGS. 6, 7 and 8 are simplified views of the interengaging portions of the grinding wheel employed and a section of a hand saw to be ground thereby at various stages in the cycle of operation.

Figure 1:
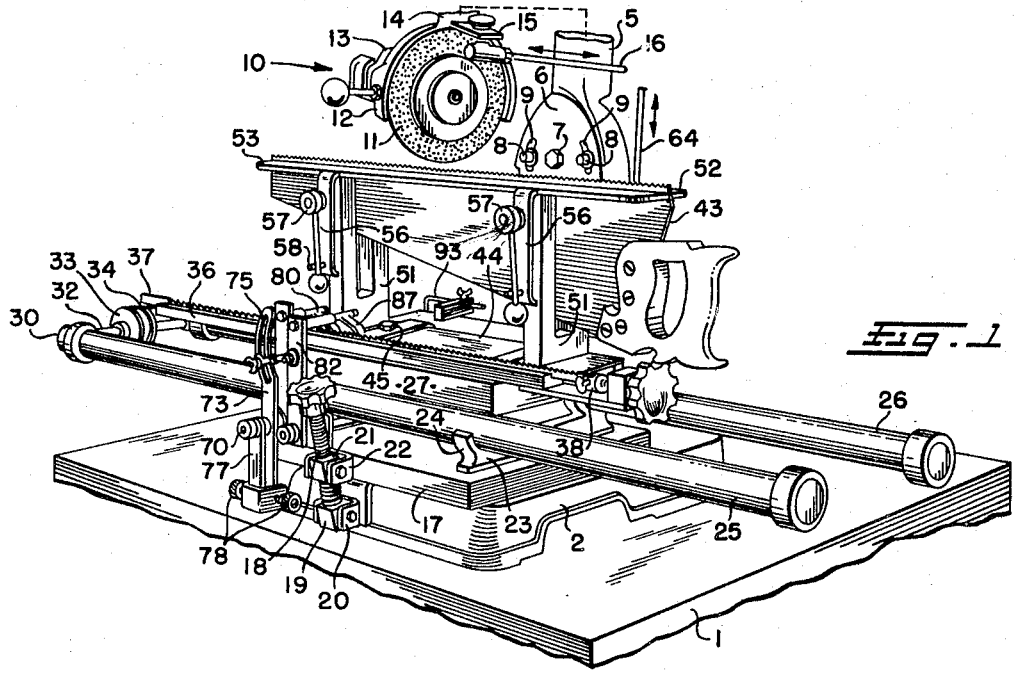
FIG. 1 is a perspective view of a hand saw grinder in accordance with the invention, there being certain parts broken away as unnecessary for proper and full understanding of the nature of the present improvements.

Referring now to the drawings in detail, the illustrated hand saw grinder is shown as supported on a table 1 intended simply to represent any convenient available structure for holding the grinder at a comfortable working elevation. The grinder comprises a base 2 generally of inverted dished formation resting upon the top of the table 1 or other support.

At a rear portion of this base, there is a pedestal or post 3 which extends upwardly a relatively short distance and terminates in an integral flattened generally circular end portion 4. Secured to the latter is a shaft continuation 5 having a lower circular end 6 overlying the front of the end portion 4 of the bottom post. As shown in FIG. 1, the thus overlying sections 4 and 6 are interconnected by a center bolt 7 and outward cap screws 8 passed through holes in the portion 4 and slots 9 in the end portion 6. This connection of the upper shaft continuation 5 and the bottom pedestal permits the former to be adjusted to different angular positions away from the vertical by simply loosening the cap screws, swinging the shaft 5 within the range of such movement provided by the slots 9 to the selected position, and then retightening the cap screws.

The shaft continuation 5 is shown broken away, since it forms the support for the general head structure which is unimportant to the present invention apart from the actual grinding wheel assembly designated generally by reference numeral 10. The present improvements are thus especially concerned with the saw locating and feeding assembly, which is shown and will be described in detail, and the exact means for forming the head and the source of power for the drive elements to be discussed can be of any suitable form and arrangement. The grinding wheel assembly 10 is shown as comprising a removable wheel 11, a housing 12 for such wheel partially to enclose its periphery, and an electric motor 13 for rotating the wheel on its axis.

This assembly 10 has been shown as suspended by a broken away front post 14, and it will be understood that this constitutes a support shaft conventionally mounted in the head for generally vertical reciprocation at the angle determined by the previously noted angular adjustment of the continuation shaft 5. This support shaft 14 will also be rotatable on its axis, and a radially extending arm 15 is shown serving as a crank connected to a drive rod 16 which is reciprocated in and out, as shown by the arrows, to effect turning of the wheel from its preset first angular position to its second relatively reversed angular working position. This type of movement is of course commonly provided in known machines of such class for reversing the sharpened edges of the teeth along the saw as established and provided in the initial formation of the same. The grinding wheel can accordingly be caused to move down at its first angular disposition as illustrated to engage adjacent tooth edges, moved upwardly or retracted to clear the saw, reversed to its second angular disposition while the saw is advanced one step, and then advanced again in this other disposition to alternately grind the two succeeding edges, all as known.

Turning now to the areas of particular improvement provided by the present invention, the base 2 mounts a superimposed track support base 17 which rests on the top of the base 2 and is capable of having its plane adjusted relative to that of the base by actuation of differential screw 18. It will be seen that the upper part of this screw 18, of larger diameter and coarser thread, engages in a pivot nut 19 attached by a bracket assembly 20 to the base 2. The lower end of this screw, the assembly generally vertical and at the front of the grinder, is of smaller diameter and finer thread and engaged in a pivot nut 21 mounted by a bracket 22 against the front of the track support base 17. The screw 18 has, as shown, a knob at its upper end, and it will be apparent that actuation of this screw will cause relative tipping of the base 17 or very fine and quick adjustment of the disposition of the plane of this track support base relative to the main base. The purpose of this adjustment will be later described.

A track support member 23 is affixed at each end of the support base 17, with these supports extending from front to back across the base support and having semicircular upwardly projecting seats 24 at the ends. Supported in and secured to the supports 23 at such seat portions of the same are two track shafts of tubular formation, there being a front such shaft 25 and a rear shaft 26 in spaced parallel relation, with the two such shafts of considerable coextensive length extending relatively across the machine. As viewed from the front of the grinder, these track shafts are generally horizontal and extend appreciably to both sides of the main base 2.

A carriage 27 is mounted for movement along the track shafts 25 and 26, with this carriage being of inverted dished formation and supported on the front shaft 25 by a roller 28 engaging the top of the former and by two sets of angularly related rollers 29 in opposed engagement with the rear track shaft 26 respectively in the rear corner regions of the carriage. It will be apparent that the carriage 27 is thus ordinarily freely movable along the track shafts, with the roller pairs 29 providing lateral stability against movement either to the front or rear.

At the left side of the grinder, as viewed from the front, a bearing block 30 is secured to the end cap of the shaft 25, and a similar bearing block 31 is attached in the same manner to the end cap of the rear shaft 26. These blocks respectively support the ends of a transverse spool shaft 32 carrying at its approximate center a spool 33 on which a flat spring strip 34 is wound. The free end of this spring strip is attached at the point 35 to the carriage 27, and this connection serves normally to pull the carriage to the left. All displacement of the carriage along the track shafts away from this left terminal position is accordingly resiliently resisted by the spring 34, which will unwind to accommodate such movement but will maintain the carriage continuously under tension or force tending to bring it back to the retracted condition.

As will be later apparent, the carriage is moved toward the right or away from this position in the feeding of the saw through the machine, so that this condition of tension will be present throughout the operation and is utilized in a manner to be described.

The carriage 27 supports an upwardly open channel member 36 along and adjacent the front edge of the carriage, and this channel is adapted to receive therein a precisely selected gauge or index bar 37. This bar is precisely machined to a defined tooth form for a given type of saw and, in effect, comprises a series of upper edge teeth which should correspond exactly to the pitch of the teeth of the given saw. Such index bars are known as such, particularly in the initial manufacture of saws, and will be provided in sufficient number and formation as to correspond with the different types of available saws.

The index bar 37 is accurately positioned lengthwise by being clamped at its right end in a socket 38 into the other side of which an index adjusting screw 39 is threaded. This screw passes through an index shifter housing 40 on the outer end of a bracket 41 extending beyond the end of the channel 36 and has a hand knob 42 at its outer end for convenient actuation. Turning of the knob 42 thus will cause the index bar 37 to be adjusted lengthwise on the carriage 27.

The carriage 27 also supports saw clamping means generally on the order of a vise assembly for holding a hand saw 43 with its cutting edge uppermost and extending in the direction of movement of the carriage 27 along the track shafts 25 or 26 or, in other words, in the feed direction. The saw vise assembly includes an alignment bar 44 attached to the carriage by a bolt 45 near one end which serves as a pivot about which the bar 44 can be angularly adjusted on the carriage. This adjustment is effected by means of two thumb screws 46 and 47 extending in opposition respectively through downturned ears 48 and 49 near the right end of the plate 44 commonly into engagement with a projecting flange bracket 50 at the corresponding end of the carriage 27. By loosening the bolt 45, if not already providing a loose pivot, and manipulating the thumb screws 46 and 47 oppositely, the plate 44 can very finely be angularly adjusted about the axis of the bolt 45.

The vise alignment bar 44 carries in upwardly projecting relation adjacent its respective ends, a pair of U-shaped vise frames 51, with these frames being bolted or otherwise suitably fastened to the bar 44 in such manner as to move therewith and thus partake in any angular adjustment of the bar. The frames 51 are oriented so that they are in transverse disposition and open at their upper ends. The rear legs of these frames support a fixed horizontal vise strip or bar 52, and the vise is completed by an opposed front clamping strip or bar 53 extending across the tops of the forward legs of the frames 51 and adjustably attached to the same by bolts 54 passing through slots 55 in such front bar into the frames. Clamp straps 56 having top and bottom inturned flanges are respectively secured to the front legs of the frames 51, with their top flanges abutting the forward edge of the adjustable vise bar 53 and the bottom flanges against the front legs of the frames at a substantial downward displacement. Lever actuated screws 57, with the levers provided for easy actuation of the same, extend through the thus positioned clamping straps 56 into threaded engagement with such front frame legs, and it will be apparent that these screws serve to either open the vise or close the same under tension, the straps in this sense serving to exert spring force on the strip 53 urging the same against the rear fixed bar 52 or against the saw 43 positioned therebetween for clamping in the assembly. The straps 56 have lower forwardly projecting stop pins 58 which serve to limit the tightening movement of the screws 57 by interfering with rotation of the levers of the same after a certain degree of advance thereof.

Figure 4:
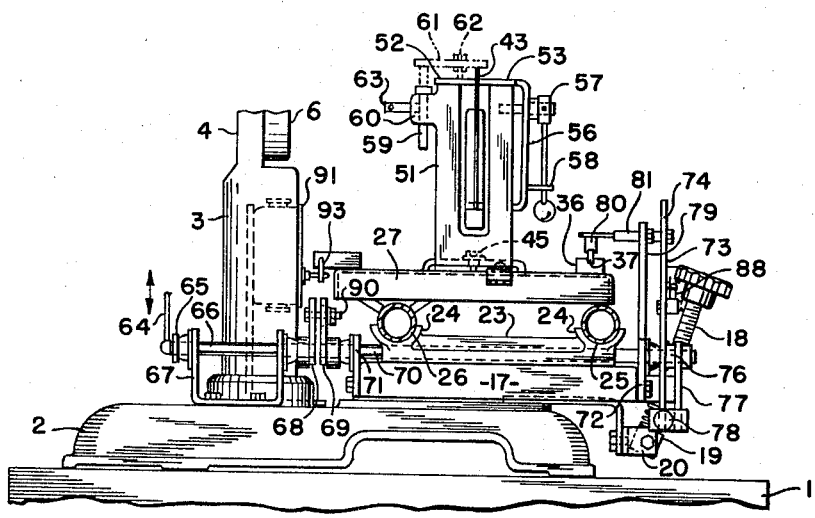
FIG. 4 is a transverse sectional view from the plane indicated by the line 4—4 in FIG. 2.

The vise assembly also includes gauges for adjustably accurately determining the elevation at which the cutting edge of the saw occurs in the locating of the same in this assembly. Such gauges, with particular reference to FIGS. 3 and 4, comprise shafts 59 supported respectively in drilled bosses 60 projecting rearwardly from the rear legs of the vise frames 51. Each such shaft carries at its upper end a horizontal gauge bar 61, and each such bar supports a vertically adjustable stop bolt 62 intermediate its ends. As best shown in FIG. 4, each such gauge device is normally held in a relatively retracted position along the back of the vise bar 52, with a locking screw 63 releasably holding the device in this disposition. In the positioning of the saw in the vise assembly, the gauge devices are first freed by backing off the locking screws 63, raised above the tops of vise bars 52 and 53, and then swung inwardly approximately to a right angle position to extend over such bars and hence the cutting edge of the saw. This gauging condition is shown by the dashed outline in FIG. 4, and it will be seen therefrom that the adjustable stop bolt 62 in each device is used to support the bar 61 at the preselected spacing above the fixed or rear vise bar 52. Accordingly, the saw is brought up against the thus positioned gauge bars 61 at both ends of the assembly and the projection of the saw above the vise uniformly established along its length. After tightening of the vise to clamp the saw, it will be understood that the height gauge bars are returned to their normally retracted rest positions.

The feed of the carriage 27, and hence the saw as located and clamped in place for grinding, is accomplished by drive means operating incrementally to advance the machined index bar 37. The source of this drive force is preferably the same as that which controls the movement of the grinding wheel, and the feed is synchronized with the action of the wheel, as will be discussed further hereinbelow. The feed direction of the carriage 27 is from left to right in the illustrated grinder, as viewed from the front, and the power take off is shown as including a vertically reciprocating rod 64, the reciprocation lengthwise being indicated by the arrows and the top leading into the area of the head structure being broken away. At its lower end, the rod 64 is pivotally connected to a generally horizontal link 65 on one end of a countershaft 66 supported rotatively in a bearing bracket 67. It will be appreciated that the link 65 acts as a crank arm causing the shaft 66 to be turned in one direction and then reversely as a result of the generally vertical reciprocation of the drive rod 64. At its other and forward end, a generally vertical coupling link 68 is secured to the countershaft 66 and will accordingly be caused to oscillate as a result of the indicated drive. This coupling link 68 is connected to an opposed link 69 mounted on one end of an index shaft 70 which is in alignment with the countershaft 66 and extends beneath the track shafts 25 and 26 to the front of the grinder base. The index shaft 70 is supported for rotation in bearing brackets 71 and 72 respectively mounted at the rear and front edges of the track support base 17.

At this front location, the index shaft 70 outwardly of the bearing bracket 72 passes through an index arm 73 which is arranged generally vertically and has a curved upper section 74 in which an arcuate slot 75 is provided. There is a spacer 76 affixed to the front face of the index arm 73 through which the index shaft 70 continues forwardly, and there is an outer parallel strap 77 depending from an upper end attachment to the shaft 70. The lower end of the strap 77 carries a U-shaped bracket through the sides of which thumb screws 78 are oppositely threaded into engagement with the bottom portion of the index arm 73. The turning of shaft 70 is thus transmitted to arm 73 through strap 77 and relative angular adjustment of the two is provided by the screws 78 included in the interconnection thereof.

Behind the index arm 73, there is a fixed vertically extending bar 79 which mounts an inwardly projecting stop pawl 80 rotatably in a pawl holder 81. The disposition of this stop pawl 80 locates the same over the index bar 37 for engagement with the teeth of the latter in a manner later to be more fully described. It will be noted that the index pawl extends to the right or, in other words, generally although at an angle in the carriage feed direction.

An oscillating feed arm 82, also generally in the form of a vertical bar, is mounted for rotation on a shaft 83 supported in front and rear bearing brackets 84 and 85, the shaft 83 being substantially parallel and in the same plane as the previously described index shaft 70 and displaced to the right of such index shaft. The feed arm 82 carries at its upper end a feed pawl holder 86 from which a feed pawl 87 projects rotatably to the rear and over the index bar 37 at a spacing which is relatively forward of the stop pawl 80 in the direction of the feed movement. The drive pawl 87 is similarly oriented in respect of the index bar as the stop pawl 80.

The feed arm 82 is driven in an oscillating or rocking manner about its shaft 83 by means of a connecting rod 88 which is secured at one of its ends to the upper portion of the arm 82 and at its other end to the upper curved portion 74 of the index arm 73. More particularly, this last connection is provided by a bolt 89 extending through such end of the rod 88 and through the arcuate slot 75 of the index arm. This connection, moreover, includes a forward wing nut on bolt 89 and, by loosening of such nut, the point of connection can be adjusted along the extent of the arc provided by the slot 75. It will be appreciated that this adjustment will effectively vary the throw of the arm 82 relative to and as a result of the oscillation of the index arm 73. By this expedient, the increment of longitudinal advance of the carriage 27 can be adjusted to accommodate the grinding of saws of varying pitch. In order to accommodate the noted tilting adjustment of the track support base 17, the coupling of the countershaft 66 to the index shaft 70 is accomplished by a bolt 90 passing through a hole in the link 68 and a vertical slot in the opposed link 69. It will be obvious that this last form of connection provides a flexibility permitting the tilting without binding of the shafts in their bearings.

As earlier noted, the drive for the saw carriage is synchronously related to the reciprocation of the grinding wheel, and it will now be apparent that this timed motion is transferred through the rod 64, the crank link 65, countershaft 66; and coupling 68 and 69 to the index shaft 70. The oscillation of the latter produces rocking of the index arm 73 which, in turn, causes the feed or drive pawl 87 to push the carriage forwardly, that is, in the feed direction by engagement of this pawl with the teeth of the index bar 37 carried on the carriage. The saw to be ground will of course have been accurately positioned and clamped in the vise assembly, with appropriate adjustments for tilting of the track support base 17 by the centering screw 18, the lengthwise angular position of the vise frames 51 through the action of the thumb screws 46 and 47 on the bar 44 supporting the same, and the gauging of the projection of the cutting edge of the saw above the vise bars 52 and 53 by means of the gauge devices including stops 62 at each end.

From the nomenclature used in the foregoing, it will be appreciated that the pawl 80 performs a stop function, and this action is related to the circumstance of the spring force always present on the carriage 27 tending to move it reversely to the direction of feed. The pawl 80 is essentially in the nature of an idler in the sense that it will ride freely over the teeth of the index bar 37 as the latter is advanced. These teeth are usually of saw tooth formation, as best shown in FIG. 2, with the longer edges of the same leading in the direction of the feed motion.

The operation is such that the pawl 87 will bear against the rear side of a given tooth on the index bar, and the rocking of the feed arm 82 will result in advancing the bar and hence the carriage and saw, against the noted return spring force, a distance corresponding to the length of one tooth. This would constitute a single forward stroke of the drive mechanism, and the return stroke serves to bring the feed pawl 87 relatively back over the first noted tooth for engagement behind the next tooth. As soon as the pawl 87 commences its return stroke, the tension provided by the spring 34 tends to pull the carriage 27 back, and this return movement, which can be very slight, is arrested by the stop pawl 80. The operation of course continues for stepwise advance for the full desired traverse of the carriage in the same sequence of individual actions.

It is preferred that the grinder be automatically turned off in the event that the carriage 27 completes its travel to the end of the track shafts 25 and 26 without notice of the operator and manual termination of the drive. As a matter of fact, after initial set up, the operation can be left to proceed unattended, with the noted automatic stopping provided in the illustrated embodiment by a limit switch 91 mounted on the base 2 at the rear of the carriage 27, with an actuator 92 projecting forwardly, and an adjustably positioned trip finger 93 carried at the rear of the carriage. The relative positioning of the switch 91 and the trip finger 93 is such that the former is actuated by the latter when the carriage is approximately at its maximum advanced condition on the track assembly.

It is futher preferred that the described incremental feeding of the saw be in such timed relation to reciprocation of the grinding wheel as to provide the sequence of tooth edge grinding illustrated in FIGS. 6 to 8. In the first of these simplified illustrations, the grinding wheel 11 is represented as retracted relative to the saw 43, with the latter stationary in an indexed position and the wheel ready to descend into engagement with the tooth edge designated by reference numeral 94. Such advance and grinding engagement is in the nature of a plunge grind, the saw remaining stationary, and FIG. 7 showing the bottom or limit of this grinding step. As soon as the grinding wheel thus bottoms, it commences to retract or move up vertically and, in accordance with the preferred method, this retraction coincides with longitudinal advance of the saw, whereby the adjacent tooth face 95 is ground while both of these movements occur. The retraction of the wheel is completed and the wheel then oscillated as the indexing of the saw is completed as set forth in the above, whereupon the saw again advances on the next edge to plunge grind the same and continue the grinding of the next succeeding edge during the further retraction, the cycle of course being repeated throughout the length of the operation.

It will be seen that the saw feeding operation provided by the disclosed apparatus involves distinct advance and stop actions accomplished respectively through the feed pawl 87 and the stop pawl 80, together with the spring 34. In other words, this feeding does not entail or rely upon moving the carriage forwardly to a position the location of which is determined solely by the extent or limit of the advance. A much more positive and accurate location is provided by the "back up" action due to the spring and stop pawl, whereby the indexing is actually unaffected by all of the factors which could possibly influence and disturb, however, minutely, the entire transmission of the drive force used for the advance. By virtue of the several factors of adjustment also provided, the initial set up for grinding a given hand saw is easily and very accurately accomplished, and the reliability is such that the operation can then be permitted automatically to proceed to completion, there being no requirement for the close attention which must be paid to the operation of other ostensibly automatic apparatus for grinding such saws.

Other modes of applying the principle of the invention may be employed, change being made as regards the details described, provided the features stated in any of the following claims or the equivalent of such be employed.

I, therefore, particularly point out and distinctly claim as my invention:

1. In combination in a hand saw grinder, saw supporting and feeding means comprising a track assembly, a carriage mounted on said track assembly for movement therealong in a feeding direction and in reverse return direction, spring means biasing said carriage in such return direction and resiliently resisting the movement of the carriage in the feeding direction, thereby to maintain the carriage under advance-resisting tension, saw clamping means on the carriage for holding the saw to be ground extending in the direction of carriage movement, and drive means for advancing the carriage and the saw thereon in a series of steps in the feeding direction against the return force exerted by said spring means.

2. The combination set forth in claim 1 including a main base, a track support base thereon mounting said track assembly, and hand operated adjusting means for angularly varying the plane of the track support base relative to that of said main base.

3. The combination set forth in claim 1 in which the saw clamping means is adjustably mounted on the carriage, with adjustment thereof varying the angle at which a saw in the clamping means extends relative to the direction of carriage movement.

4. The combination set forth in claim 1 in which the saw clamping means comprises vise pieces in the form of opposed clamping bars for engaging the saw therebetween with its toothed edge projecting outwardly of said clamping bars, and retractable gauge devices are provided for setting the amount of such projection at both end regions of the saw edge.

5. The combination set forth in claim 1 in which the drive means for advancing the carriage stepwise includes a first member for forcing the carriage forward in each step of the advance, and a second member is operative normally as an indexing stop preventing return of the carriage by the spring means as each step is completed, whereby the first member is not required to hold the carriage in its successive positions of the feeding movement thereof.

6. The combination set forth in claim 5 in which said second member engages a toothed index bar secured to the carriage in such manner as to permit the feeding advance but to arrest return movement.

7. The combination set forth in claim 6 in which said index bar is detachably secured to the carriage for replacement by a selected other such bar of different tooth formation.

8. The combination set forth in claim 7 in which the attachment of the index bar to the carriage includes hand screw adjusting means for fine longitudinal adjustment of the bar relative to the carriage.

9. In combination in a hand saw grinder, track means, carriage means supported for movement along said track means, clamping means for mounting a saw on the carriage means so that it extends substantially in the direction of the carriage movement, tensioning means for normally holding the carriage means in a relatively retracted initial position on the track means, an index bar secured to the carriage means and having teeth of selected form and spacing along the length thereof, said bar also being oriented to extend substantially in the direction of movement of the carriage means, drive means for advancing the carriage means in a series of steps in a feed direction away from said retracted position thereof, the tensioning means accommodating such advance but maintaining force on the carriage means urging the same in the reverse direction, said drive means including a feed pawl which oscillates and successively engages the teeth of the index bar in driving relation for such stepwise advance of the carriage means, and an indexing stop pawl also engaging the teeth of the index bar, with such stop pawl normally precluding return of the carriage means by the tensioning means upon completion of each advance step independently of the drive means.

10. The combination set forth in claim 9 in which the index bar is removably attached to the carriage for substitution of different such bars, and the attaching means therefor includes a hand screw adjustment for fine longitudinal positioning on the carriage means.

11. The combination set forth in claim 9 in which the track means is mounted on a support base, and the mounting thereof includes adjusting means for varying the planar disposition of said base relative to the horizontal.

12. The combination set forth in claim 9 in which said drive means includes an adjustable connection, the adjustment of which varies the degree of the oscillating movement of the feed pawl.

13. The combination set forth in claim 9 in which the clamping means is mounted on the carriage means by an adjustable interconnection providing angular adjustment of a saw in the clamping means relation to the direction of travel of the carriage means.

14. The combination set forth in claim 9 in which the track and carriage means are respectively provided with cooperable switch means for stopping the drive of the carriage means after predetermined feeding travel of the same.

References Cited by the Examiner

UNITED STATES PATENTS 3,204,491   9/1965   Sagarian _____ 76—43

GRANVILLE Y. CUSTER, JR., *Primary Examiner.*